United States Patent [19]
Courts et al.

[11] Patent Number: 6,076,108
[45] Date of Patent: Jun. 13, 2000

[54] SYSTEM AND METHOD FOR MAINTAINING A STATE FOR A USER SESSION USING A WEB SYSTEM HAVING A GLOBAL SESSION SERVER

[75] Inventors: Howard R. Courts; Neil K. Dholakia; Craig L. Dunn, all of Austin; Brian J. Huddleston, Round Rock; Erik L. Huddleston, Austin; Bruce C. Macartney-Filgate, Austin; Timothy J. McHyde, Austin; Jacob Poorte, Austin, all of Tex.

[73] Assignee: i2 Technologies, Inc., Dallas, Tex.

[21] Appl. No.: 09/036,010

[22] Filed: Mar. 6, 1998

[51] Int. Cl.[7] ........................... G06F 15/16
[52] U.S. Cl. ........................ 709/227; 709/219
[58] Field of Search ....................... 709/227, 228, 709/238, 219, 203

[56] References Cited

U.S. PATENT DOCUMENTS

| | | | |
|---|---|---|---|
| 5,708,780 | 1/1998 | Levergood et al. | 709/229 |
| 5,710,887 | 1/1998 | Chelliah et al. | 395/226 |
| 5,815,665 | 9/1998 | Teper et al. | 709/229 |
| 5,835,724 | 11/1998 | Smith | 709/227 |
| 5,884,312 | 3/1999 | Dustin et al. | 707/10 |
| 5,905,988 | 5/1999 | Schwartz et al. | 707/104 |

*Primary Examiner*—Zarni Maung
*Attorney, Agent, or Firm*—Baker Botts L.L.P.

[57] ABSTRACT

A system and method are provided for maintaining states for user sessions with a web system. Maintaining state includes receiving a request from a user that initiates a user session with the web system and processing the request to provide a web page to the user. Session data (220) representing a state of the user session is stored in memory in a global session server (212). Then, for each subsequent request associated with the user session, the subsequent request is received, and the session data (220) is retrieved from the global session server (212). The subsequent request is then processed using the session data (220) to provide a web page to the user, and the session data (220) is changed to reflect the processing. The session data (220) is then updated in the global session server (212). The global session server (212) thereby stores session data (220) unique to each user session accumulated over multiple web transactions. In one implementation, the session data (220) includes name/value pairs where the values can be self describing objects such as text, numbers, arrays, and interfaces to other objects.

22 Claims, 4 Drawing Sheets

SYSTEM AND METHOD FOR MAINTAINING A STATE FOR A USER SESSION USING A WEB SYSTEM HAVING A GLOBAL SESSION SERVER

TECHNICAL FIELD OF THE INVENTION

The present invention relates in general to the field of public networks and network communication and, more particularly, to a system and method for maintaining states for user sessions with a web system.

BACKGROUND OF THE INVENTION

For many business enterprises, it has become important to reach customers, vendors and employees through the Internet or other public network. Consequently, there is a large and growing number of web-based site development and management tools available to enterprises that want to create or improve a presence on the Internet. However, a number of problems are recurrent in such web development efforts and not adequately addressed by conventional web site development and management tools.

Web-based communication is different from mainframe and client-server arenas where many information services (IS) departments have most of their expertise. One difference is that HTTP, an underlying protocol of web communication, is both connectionless and stateless. This causes a problem for dynamic interactions with the user where a web system needs to be able to keep track of the user's state during a session involving multiple web interactions (e.g., web page requests). Without a way to manage state, between web transactions the system will have "forgotten" information about the user and the context of the session. This can be further complicated by the fact that in many large web systems the user does not interact with the same web server from transaction to transaction.

SUMMARY OF THE INVENTION

In accordance with the present invention, a system and method for maintaining states for user sessions with a web system are disclosed that provide significant advantages over conventional web-based system development and management tools.

According to one aspect of the present invention, maintaining state includes receiving a request from a user that initiates a user session with the web system and processing the request to provide a web page to the user. Session data representing a state of the user session is stored in memory in a global session server. Then, for each subsequent request associated with the user session, the subsequent request is received, and the session data is retrieved from the global session server. The subsequent request is then processed using the session data to provide a web page to the user, and the session data is changed to reflect the processing. The session data is again updated in the global session server. The global session server thereby stores session data unique to each user session accumulated over multiple web transactions. In one implementation, the session data includes name/value pairs where the values can be self describing objects such as text, numbers, arrays, and interfaces to other objects.

A technical advantage of the use of the global session server is that it allows a web system engine to remain stateless with respect to an ongoing user interaction with the web system. This ability to remain stateless frees web system engine to effectively manage server load balancing and other speed issues. Further, by separating the state information from important enterprise data (which can be stored in secure databases), the global session server allows the web system engine to more quickly associate a state with a particular user request that reflects the history of the current user session.

Other technical advantages should be readily apparent to one skilled in the art from the following figures, description, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Enterprise Interaction Hub Logical Layout

Figure 1:
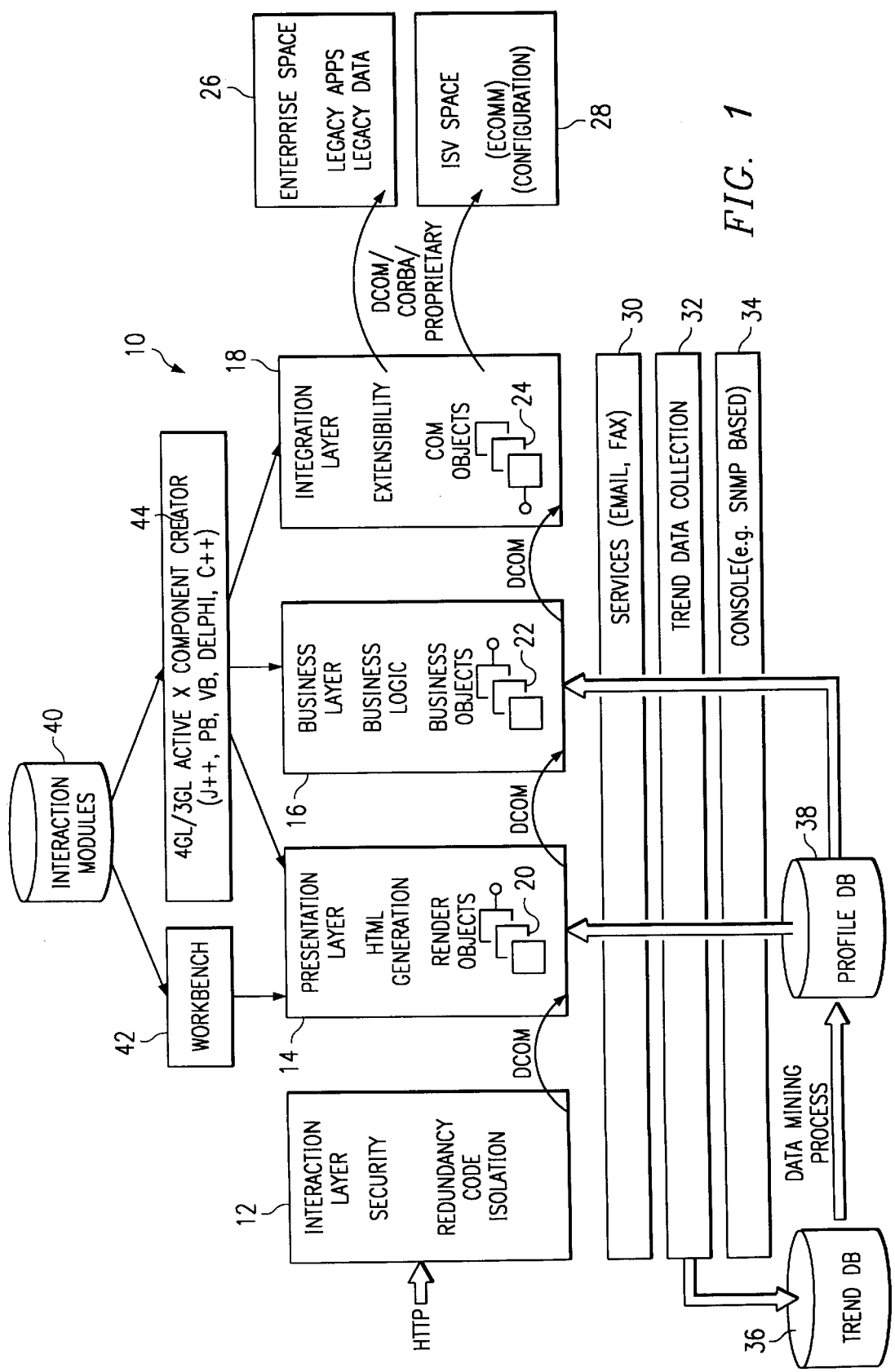
FIG. 1 is a block diagram of one embodiment of a logical layout of an enterprise interaction hub for managing an enterprise web system.

FIG. 1 is a block diagram of one embodiment of a logical layout of an enterprise interaction hub, indicated generally at 10, for managing an enterprise web system. One example of a commercially available enterprise interaction hub implemented using the layered architecture of FIG. 1 is the SMART DNA™ HUB available from SMART Technologies, Inc. of Austin, Tex. As shown in FIG. 1, hub 10 comprises a series of layers bound together through the use of a communication protocol such as DCOM. The layers include an interaction layer 12, a presentation layer 14, a business layer 16 and an integration layer 18. Presentation layer 14 includes render objects 20, business layer 16 includes business objects 22, and integration layer 18 includes COM objects 24. Integration layer 18 interfaces to enterprise space 26 that may include legacy applications and data and to independent software vendor (ISV) space 28 that may include various ISV applications, such as ECOMM or configuration applications (such as the configuration product available from CALICO).

Services 30, trend data collection layer 32 and management console 34 span the four layers 12, 14, 16 and 18. Trend data collection layer 32 can store data, based upon user activity over time, in a trend database 36. One use for trend database 36 is to be mined for data to populate a profile database 38. This profile data can be used to characterize individual users and can be fed back into presentation layer 14 and business layer 16. Further, interaction modules 40 provide management and interface functions including a workbench 42 and component creator 44. This layered architecture for hub 10 allows the various functional areas of a web system to be insulated from each other helping to improve web system robustness while easing development and quality assurance through clear demarcations of functionality. The layered architecture also allows pieces of the web system to evolve individually as business needs and web technologies change.

In operation, interaction layer 12 serves as the front door to the web system. Interaction layer 12 can be responsible for enforcing security, managing sessions, and distributing requests to the most available servers. By actively monitoring the status of render engines in presentation layer 14, interaction layer 12 is able to ensure high availability and optimum load balancing across the web system. Interaction layer 12 can also provide an important optimization in the form of page caching, a technology which improves performance four-fold over dynamically generated pages. In one implementation, integration layer 12 is built around the MICROSOFT® INTERNET INFORMATION SERVER and incorporates system-wide session management and comprehensive security. In this manner, integration layer 12 of hub 10 handles many of the technical difficulties of web development.

Presentation Layer 14 can server to generate web pages for interaction with the user. In one implementation, presentation layer 14 includes hypertext markup language (HTML) pages augmented by a special set of tags. The pages within presentation layer 14 can be edited through the page development and management environment provided by workbench 42. In one implementation, workbench 42 is built around MICROSOFT® FRONT PAGE and VISUAL SOURCE SAFE and is integrated into a database-centric architecture for managing content. Workbench 42 can provide HTML editing, tightly integrated version control, and page promotion tools (e.g., to promote pages from development, through quality assurance and to production). Further, using a server side tag set and standard HTML, developers can create a large proportion (e.g., 90%) of all pages without custom code. At the same time, such pages can have the power to access information in legacy systems through integration layer 18, utilize business rules in business layer 16 to make complicated decisions, and display customized content. However, even the most complete server-side tag set may not meet every conceivable business need. For that reason, render engines in presentation layer 14 are responsible for interpreting the tag set which is expandable through render object extensions. New tags or whole tag sets can be developed to meet the enterprise's needs and can then be used in the HTML of the page with no coding on the part of the developer.

Business layer 16 provides the business logic for the web system. Business layer 16 includes the business rules of the system which are carefully isolated from the presentation layer. The business rules can be implemented as COM business objects 22 within business layer 16. This separation into a layer has the advantage of centralizing business rules and guaranteeing that business rules are implemented consistently throughout the system. This makes the business rules far easier to change than in systems where such rules are embedded in the page. Further, this approach makes page and business rule development more simple and less expensive. For example, HTML developers can be responsible for developing and maintaining a page while programmers can implement business rules. Since each rule or set of rules can be a separate COM business object 22, business rules can be unit tested reducing the complexity of quality assurance and improving the overall robustness of the web system. This separation provides another major advantage which is the protection of the enterprise's investment in custom coding. For example, when new versions of HTTP are released or HTML is replaced by XML as the standard of choice, the business logic of web systems built upon hub 10 will continue to work without modification of business layer 16.

Integration layer 18 allows the system to tie into a wide array of existing legacy applications, databases and third party software present in enterprise space 26 and ISV space 28. Integration layer 18 can utilize DCOM and CORBA or can be extended to use proprietary standards for communicating with other parts of the enterprise. By isolating the difficult issues of integration into a separate layer, the overall cost of web system development can be decreased. HTML developers can develop the pages of presentation layer 14 which access the enterprise's other systems through tags in the page rather then requiring skill sets necessary to integrate into those systems. In the same way, integration layer 18 provides visibility to the rest of the enterprise for business logic layer 16 through the use of application program interfaces (API's), allowing cost-effective junior level programmers to implement the bulk of the web system business logic.

Trend data collection layer 32 is a transparent layer that monitors and accumulates historical information from layers 12, 14, 16 and 18 in hub 10 and stores that information in trend database 36. As a request is processed through the layers, the layers generate events providing information about the request. These events can be as high level as simple transaction log events which detail that a request for a given page came in with a certain session ID and IP address or can be as granular as events generated by individual business rule objects detailing their specific interactions with the request. By customizing the events that are generated and captured, the business can capture any level of detail about the web system's functioning without impacting system performance. This information can then be used to meet the business' needs for history, reporting, capacity planning, system monitoring and, through the profile layer, marketing research.

By tracking the interactions of customers using trend database 36, hub 10 can profile the way users typically interact with the enterprise and the products and services that interest them. This profile information is stored in profile database 38 and allows the enterprise to improve the user's interactions. Further, this profile information provides a valuable marketing research tool. The profile information can be further leveraged through advertisements and content targeted at individual customers which simultaneously serve the customer's need and increase sales for the enterprise.

Hub 10 uses profile information and business rules to provide customized dynamic content designed to appeal to the individual user's interests. This personalized content helps the enterprise serve the user's individual needs in a customized way not available through other forms of communication. This personalization can utilize business rules in business logic layer 16 and additional information from integration layer 18 to determine content to display. HTML page developers simply need to drop in appropriate tags and the content dynamically appears. Whether displaying an advertisement for accessories that complement products in the user's catalog, offering special personalized promotions, or just offering information of potential interest, personalization makes the interaction richer and more satisfying.

Console 34 provides a control center for a system built on hub 10. Console 34 allows centralized administration of the system including: adding or removing servers, monitoring render engine load, and changing the configurations for business objects and integrated third party software utilized by the system.

Hub 10 can use dynamic load balancing to evenly distribute requests across any number of web system servers. Balanced systems tend to be immune to momentary traffic spikes and much more robust under peak traffic situations. Since hub 10 actively monitors and distributes requests to the most available servers, the response time of the system becomes much more consistent and servers can be added or removed from the system transparently. To manage the problems of state and session, a global session server (GSS) is built directly into hub 10. This global session server transparently provides session information to servers in the web system and provides a fault-tolerant architecture for maintaining state. The global session server is described in more detail below.

Reliability is also a key feature of hub 10. Hub 10 is designed to allow multiple redundancy at every level and actively monitors request status and redistributes requests as necessary to guarantee fault tolerance against individual server failures. Additionally, by separating the web system into functional layers bound together through DCOM, servers are insulated against individual component failures. The component in question can be restarted without impacting other server.

Hub 10 is a database centric architecture and includes active request monitoring. As a result, hub 10 allows servers to be taken in and out of service as needed. Unlike systems utilizing the file-system to store pages, with hub 10, promotion of pages through the typical development, quality assurance, and production cycle does not involve file replication and version controlling issues. Instead promoting pages consists of changing a page status in the content database. This also means that setting up a new server is simply a matter of installing the hub software, the server will then gather all its settings and pages from a centralized distribution point. From an administrative standpoint, there is the capability of using the monitoring and remote administration tools built into a WINDOWS NT Server. Additionally, the system's settings and statuses are centrally controllable with console 34. Also, by complying with standards for SNMP and Performance Monitor counters, hub 10 can allow the enterprise to use third party monitoring tools such as TME available from TIVOLI and PATROL available from BMC SOFTWARE.

With respect to security, on top of support for firewalls, hub 10 can be configured to provide several additional levels of protection. In one implementation, tamper-proof URLs are in effect for every hub installation. For example, through the use of 128-bit encryption algorithms, hub 10 can detect a URL that has been altered and reject the associated requests. Memory based cookies can take security to the next level by validating that all requests for a single session are originating on the same machine. Security is even further enhanced through the use of the latest web-based technologies, such as SSL encryption and certificate authentication, both supported by the hub framework. Also, hub 10 can allow access to be controlled on a page-by page basis by specifying group-based access rights for each page.

Enterprise Interaction Hub Object Flow

Figure 2A:
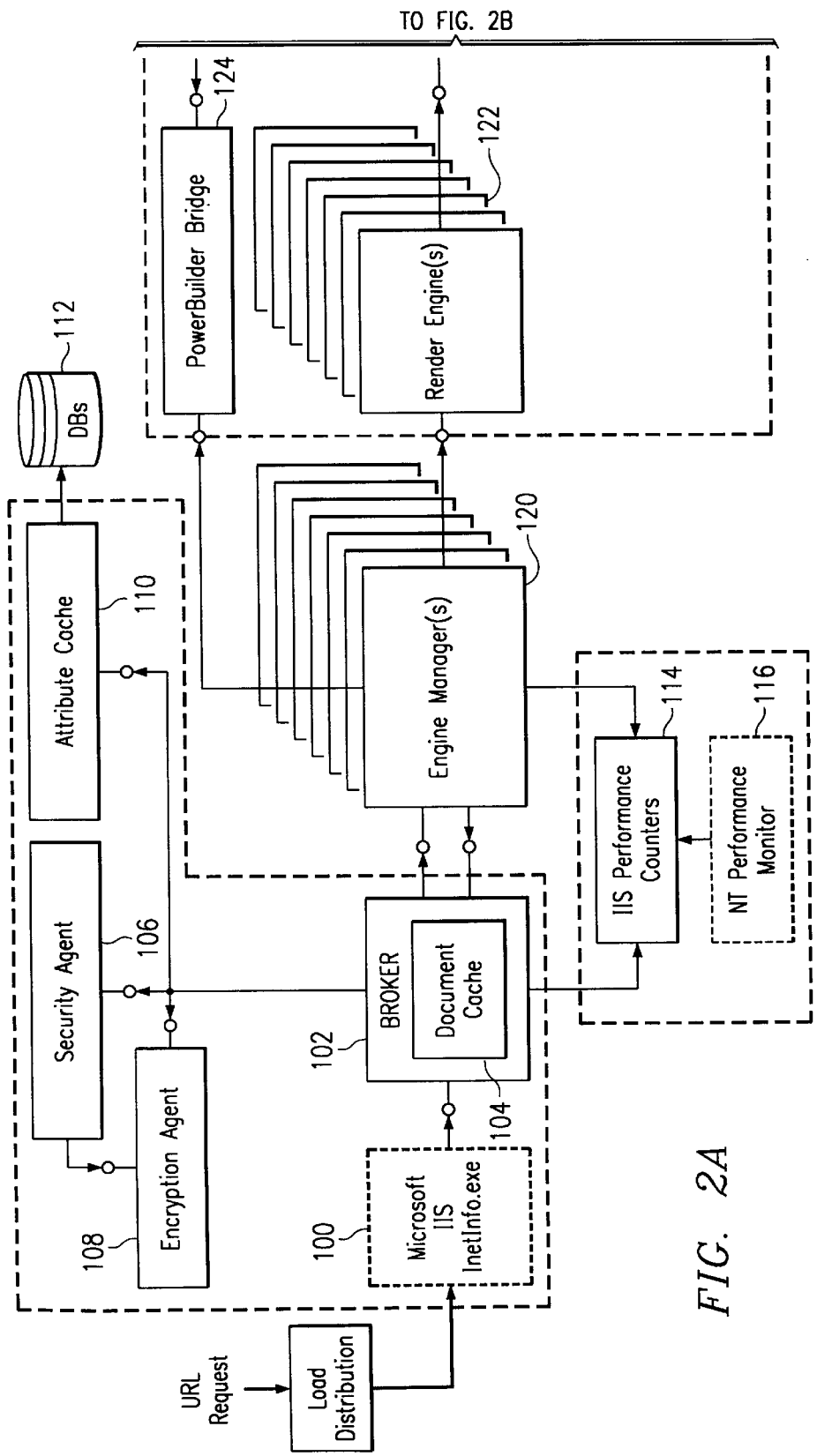
FIGS. 2A and 2B are block diagrams of object flow within one embodiment of a web system implemented using an enterprise interaction hub.
Figure 2B:
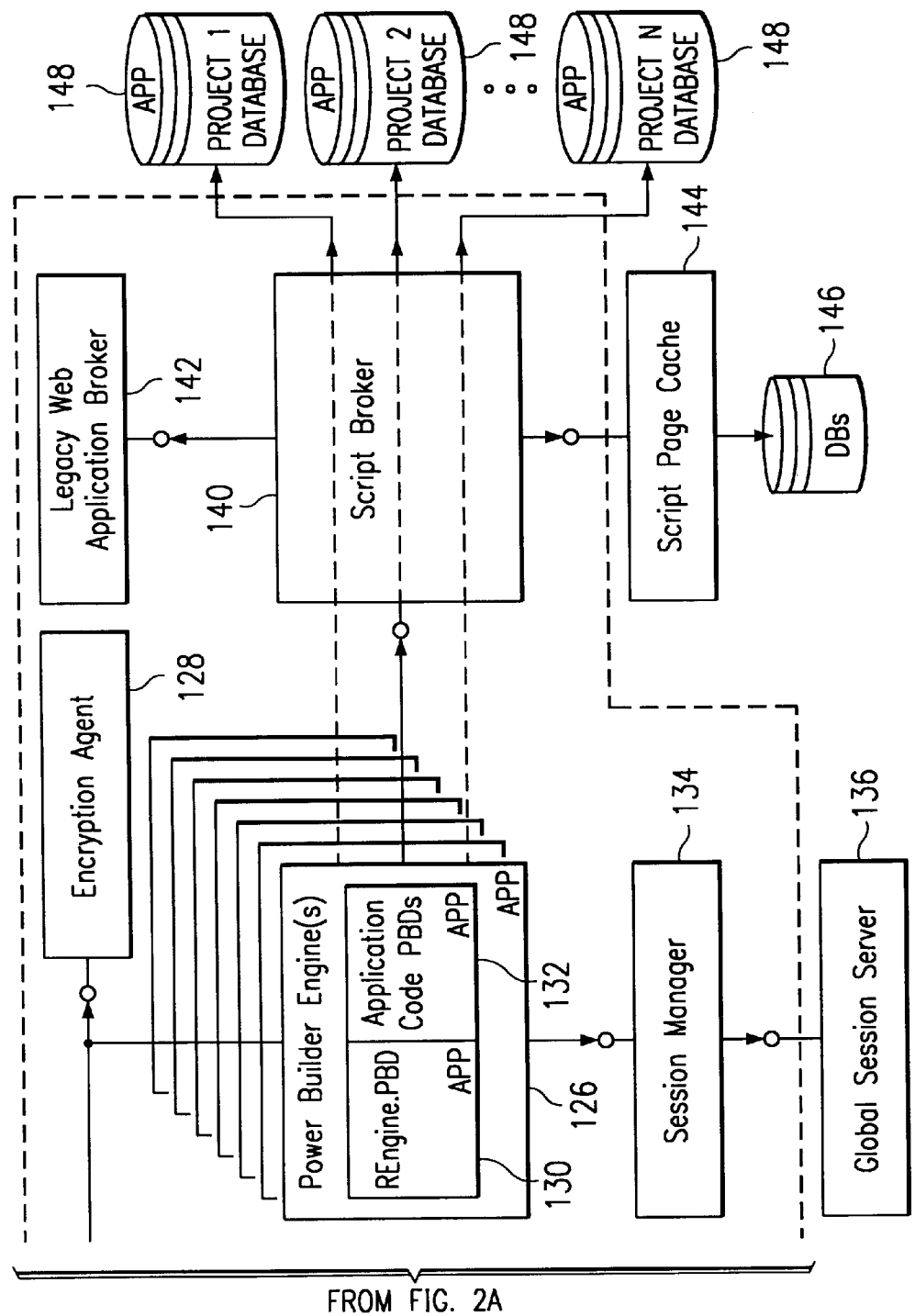

FIGS. 2A and 2B are block diagrams of object flow within one embodiment of a web system implemented using an enterprise interaction hub. In particular, FIGS. 2A and 2B represent a web system implemented using the SMART DNA™ HUB available from SMART Technologies, Inc. of Austin, Tex. As shown in FIG. 2A, a load distribution unit 98 receives user URL requests. Load distribution unit 98 then distributes each URL request to one of a plurality of physical computer systems for processing. In one implementation, load distribution unit 98 can be a CISCO Front End Local Director which uses a "round robin" or "least connections" algorithm for routing requests. Further, in this implementation, the routing scheme can use a "sticky" feature to attempt to route certain categories of requests to the same physical computer system.

In the embodiment of FIGS. 2A and 2B, each physical computer system has a MICROSOFT® INTERNET INFORMATION SERVER (IIS) 100 that receives routed URL requests. Server 100 in turn feeds a broker 102 which includes a document cache 104. Broker 102 can interface with security agent 106 which in turn can interface with encryption agent 108. Encryption agent 108 can interface with attribute cache 110 which can access a database 112. IIS performance counters 114 monitor performance of broker 102 and receives information from NT performance monitor 116.

To service a request, broker 102 interfaces with one of multiple engine managers 120. Engine managers 120 distribute the load of servicing requests to render engines 122. Engine managers 120 also interface with a Power Builder bridge 124. Referring to FIG. 2B, render engines 122 in turn interface with Power Builder (PBD) engines 126 which each can include a render engine PBD 130 and application code PBDs 132. Power Builder bridge 124 also interfaces with Power Builder engines 126, as well as encryption agent 128. To access state information relevant to a request, Power Builder engines 126 interface with a session manager 134. Session manager in turn interfaces with a global session server (GSS) 136 which stores state information for user sessions. In the implementation of FIGS. 2A and 2B, global session server 138 is maintained as a component in memory and stores data items associated with the state of a user session. To access content, Power Builder engines 126 interface with script broker 140. Script broker 140 can then interface with a legacy web application 142, script page cache 144 (and database 146) and project databases 148.

In operation, bridge 124 allows debugging of Power Builder application code 132 and render engines 122. Render engines 122 parse the raw HTML script and take an appropriate action depending on the tags. Engine manager 120 is the system element that receives requests from the broker 102, binds the request to an available render engine 122, delivers the request to a render engine 122, receives the results from the render engine 122, and delivers the results back to broker 102. Engine manager 120 can perform extensive error recovery in the case of a failure during the render process. Script page cache 144 is responsible for caching the script pages in a memory based cache to avoid fetching the script page from a database 148 on every render request. Attribute cache 110 provides fast access to (security related) group access numbers and (document cache related) cache control enumeration. Encryption agents 108 and 106 are objects that implement an encryption algorithm (e.g., MD5) and are used by several system elements to provide security. Security agent 106 is an object used by broker 102 to apply security checks to an incoming request and generate a security violation reject if the checks detect a security violation.

The enterprise hub provides a scalable, open platform for run-time production support and development of enterprise Internet and intranet applications. As mentioned above, the Internet is a connectionless environment, HTTP is a stateless protocol, and each browser request to a web server is independent. The web server does not inherently retain the state of a particular user's past requests. To solve this problem, application work flow is maintained by a session control layer provided by session manager 134 and by global session server 136. Session manager 134 bundles and stores session data to the centralized or distributed global session server 136 for access from any system node. Each time a user enters the web system the user can be given a new unique session ID. Session IDs can be set to expire after any period of inactivity or after log-out. Session information is stored at run-time by session manager 134. Application level code can query session manager 134 for session data through a COM interface.

Global Session Server Implementations

Figure 3A:
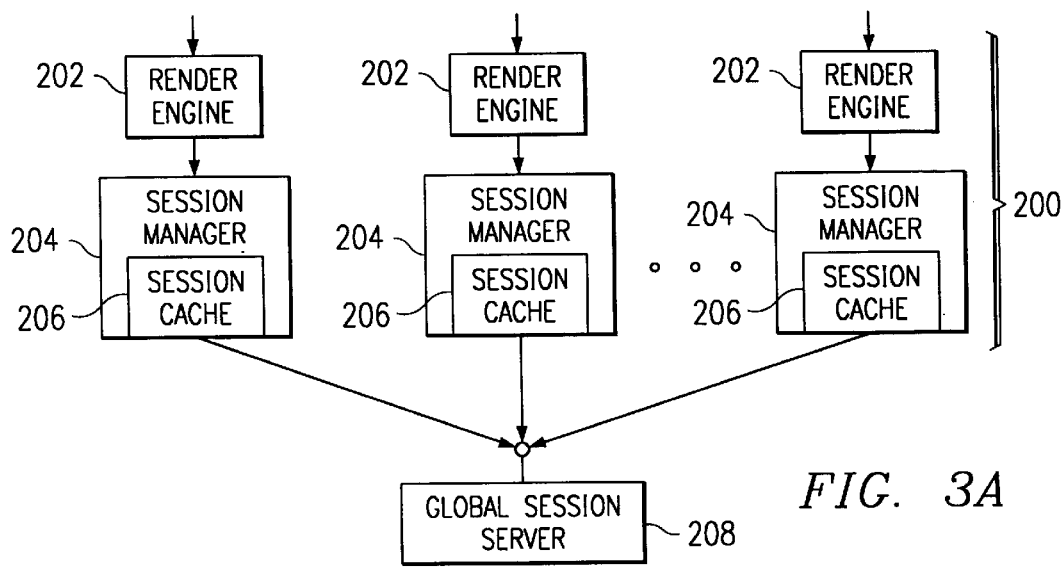
FIGS. 3A and 3B are block diagrams of an enterprise web system that implements a centralized global session server and a distributed global session server.
Figure 3B:
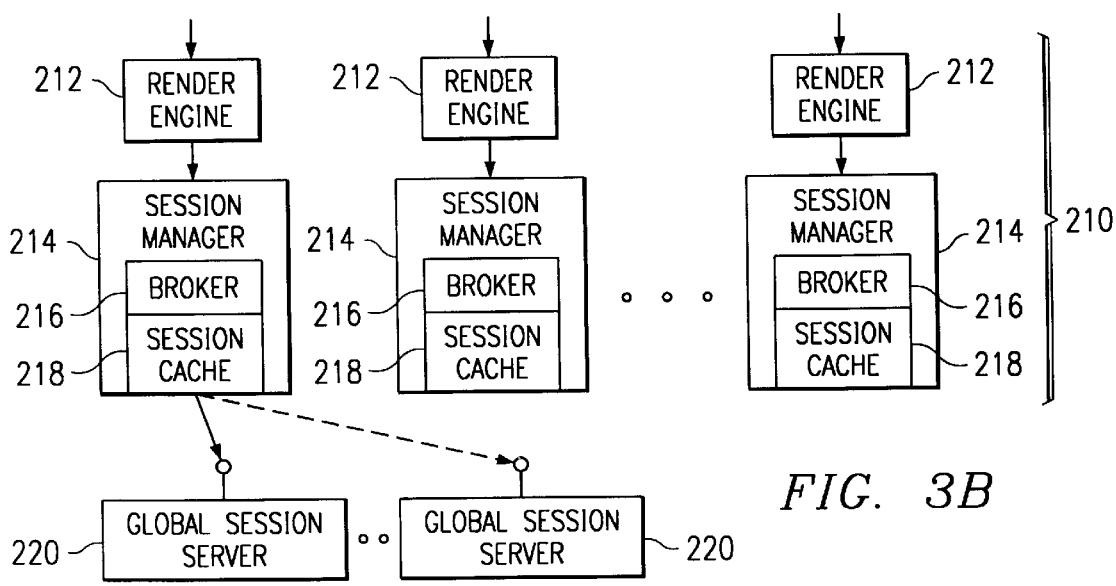

FIGS. 3A and 3B are block diagrams of an enterprise web system that implements a centralized global session server and a distributed global session server. In the embodiment of FIG. 3A, a centralized global session server is common to multiple render engines. As shown, a web system 200 includes multiple render engines 202. Render engines 202 interface to session managers 204 each of which include a session cache 206. Each session cache 206 can interface with global session server 208 which is maintained in memory for quick access. Render engines 202 can be distributed across multiple physical computer systems, and one or more render engine 202 can exist on any of the physical computer systems at a particular point in time.

In operation, web system engine 200 provides a web system that services requests for web content from users and returns web pages to users. Typically, the requests will be part of a session with the web system where the session involves multiple web interactions by a user that span a relatively short period of time or that occur between log-in and log-out by a user. Typically, the session involves a user visiting the web system to transact some type of business and then leaving the web system. The components of web system engine 200 perform various functions in servicing requests within the context of web interactions as described, for example, with respect to FIGS. 1, 2A and 2B above. It should be understood that implementations for web system engine 200 other than that shown above can be used and are within the scope of the present invention.

In the implementation of FIG. 3A, when a user engages in a session with the web system, requests from the user will be directed to render engines 202. In servicing a user request, render engines 202 can get current state information for that session through the respective session manager 204 and session cache 206 and from global session server 208. Render engines 202 then operate to process requests using the session information and return web content that reflects the state of the user session. The lifetime of the session data stored in global session server 208 can be relatively short. The session data typically spans one session by a user defined either by a specified period of time or by log-in and log-out events. Because of the short duration, the focus on global session server 208 can be to provide quick state information without the need for special security protocols.

During a user session, when a request is received, a session ID (SID) is associated with the request. The SID identifies the request as part of a particular user session. The render engine 202 processing the request passes the SID to session manager 204 to request session information for that SID. Session cache 206 within that session manager 204 then calls a "lock" on that SID within global session server 208. Assuming the session data for that SID is not already "locked", the session cache 206 well then download the session data from global session server 208 for that SID. Session manager 204 then provides the session information in session cache 206 to render engine 202. After render engine 202 has built the web page and provided it back to the user, the session cache 206 calls an "unlock", and changes to the session state are written back from session cache 206 to global session server 208. The new session data for that SID is then again available for access.

Referring to FIG. 3B, the global session server can also be distributed across multiple physical computer systems. As with FIG. 3A, a web system 210 includes multiple render engines 212. Render engines 212 interface to session managers 214. Each session manager 214 includes a broker 216 and a session cache 218. Each session cache 218 can interface with multiple global session servers 220 which is maintained in memory for quick access. Render engines 212 can be distributed across multiple physical computer systems, and one or more render engine 212 can exist on any of the physical computer systems at a particular point in time. When a user engages in a session with the web system, requests from the user will be directed to render engines 212. In servicing a user request, render engines 212 can get current state information for that session through the respective session manager 214 and session cache 218 and from one of the global session servers 220. Brokers 216 are use to locate the global session server 220 that stores the master copy of session data for the particular user session. Session cache 218 can then interface with the correct global session server 220 to obtain the session data. Render engines 202 then operate to process requests using the session information and return web content that reflects the state of the user session.

As above, when a request is received, a session ID (SID) is associated with the request. The SID identifies the request as part of a particular user session. The render engine 212 processing the request passes the SID to session manager 214 to request session information for that SID. A "lock" is then called in the broker 216 for that session manager 214. Broker 216 then determines where the master copy of session data for that SID is located. Broker 216 makes a connection through the local session cache 218 to the session cache 218 on the computer system where the master copy of session data is stored. Session cache 218 then downloads the session data from the global session server 220 that stores the master copy. Session manager 214 then provides the session information to render engine 212. After render engine 212 has built the web page and provided it back to the user, an "unlock" is called. This causes changes to the session state to be written back from session cache 218 to the master copy of the session data on global session server 220. The new session data can also be written to one or more shadow copies stored in other global session servers 220. Also, migration of the master copy to a new location can occur if, for example, enough hits from a remote system have occurred. After the "unlock" completes, the new session data for that SID is again available for access.

In one implementation, migration of master copies uses a count of the number of accesses to a master copy from any particular computer system. The master copy of the session data is then allowed to migrate to the computer system making the largest number of requests over a specified tunable threshold. This allows session data to be retrieved more quickly on the computer system accessing it most often without the expense of pulling the session data over the network. The maintenance of master and shadow copies of session data can be accomplished, for example, by using the MICROSOFT Transaction Server whereby if a change does not get completed, that copy of the data is removed from the list.

It should be understood that various implementations are possible with one or more global session servers 220 storing session data accessed through one or more session managers 214. The distribution of state information across multiple global session servers 220 allows robust operation in case of the failure of one or more software or hardware components. For example, if a master copy of session data is lost, one of the shadow copies can be promoted to be the master to maintain continuity of the user session. Further, the distributed nature can allow quick access to local memory without requiring network communication to obtain the session data.

Use of Global Session Server

Figure 4:
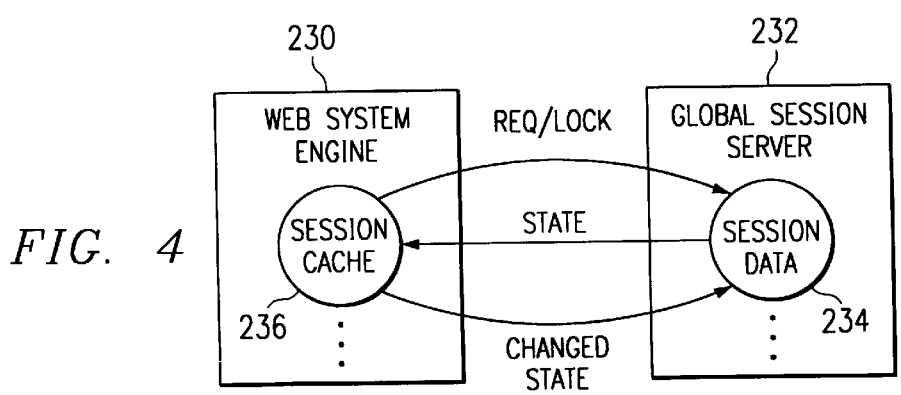
FIG. 4 is a block diagram of one embodiment of using a global session server within an enterprise web system.

FIG. 4 is a block diagram of one embodiment of using a global session server within an enterprise web system. As shown, the web system can be maintained by a web system engine 230 that has access to a global session server 232. Web system engine 230 can be like that described above, or can include other component implementations. A web interaction with the web system occurs when a user request is received and is typically part of a user session. The request is commonly an HTTP request generated by remote user software such as a web browser. To dynamically respond to the request, web system engine 230 uses global session server 232 to maintain state information about the current user session associated with the request.

In particular, the state information can be stored as session data 234 created for each user session. Session data 234 can be created when a user initiates a web interaction and there is no current session data for that user. When servicing a request, web system engine 230 can create a session cache 236 and provide session cache 236 with a session ID. Using the session ID, session cache 236 can then request the corresponding session data 234 from global session server 232. If the session data 234 is not already locked, global session server 232 can provide session data 234 to session cache 236 and lock session data 234 from concurrent access. If the session data 234 is already locked, then another session cache 236 is currently processing a request for that user session which needs to be completed. After completion, session data 234 is updated and made available. Once session cache 236 receives the session data 232, web system 230 can use this session information to help build a responsive web page. When the web page is built, it is sent to the requesting user. The session data 234 is then updated, stored in global session server 232, and released for access by another session cache 236. In one implementation, session cache 236 is not released until after one or more shadow copies of session data 234 have been made.

A technical advantage of the use of global session server 232 is that it allows web system engine to remain stateless with respect to an ongoing user session with the web system. This ability to remain stateless frees web system engine 230 to effectively manage server load balancing and other speed issues. Further, by separating the state information from important enterprise data and storing it in operating memory, global session server 232 allows web system engine 230 to more quickly associate a state with a particular user request.

The data stored in a session state 234 can include any helpful information concerning a web session with the web system. In one implementation, the session data stores a list of name/value pairs as shown, for example, in the following table.

| variable name | value |
|---|---|
| password | xxxxxx |
| address | IP address |
| ... | ... |

In this implementation, the values are simply character strings. In another, extended implementation, the session data stores variable values that are self describing objects. Such objects can include text, numbers, arrays and interfaces to other objects (e.g., application objects, images, sound files, movie files, etc.). This use of self describing objects provides a richer object structure and the implementation of more features which allow the session state to be a powerful tool to enable dynamic and individualized interactions with the web system.

Although the present invention has been described in detail, it should be understood that various changes, substitutions and alterations can be made thereto without departing from the sphere and scope of the invention as defined by the appended claims.

What is claimed is:

1. A method for maintaining a state for a user session with a web system, comprising:

receiving a request from a user that initiates a user session with the web system;

processing the request and providing a web page to the user using one of a plurality of web system engines;

storing a single set of session data representing a state of the user session in a global session server, the global session server accessible by the web system engines such that the web system engines can share the session data; and for each subsequent request associated with the user session:

receiving the subsequent request;

retrieving the session data from the global session server using one of the web system engines;

processing the subsequent request at the web system engine using the session data to provide a web page to the user;

changing the session data to reflect the processing; and updating the single set of session data in the global session server according to the changed session data.

2. The method of claim 1, wherein the session data includes name/value pairs where the values comprise text and numbers.

3. The method of claim 1, wherein the session data includes name/value pairs where the values comprise self describing objects such as text, numbers, arrays, and interfaces to other objects.

4. The method of claim 1, wherein the user session terminates after a specified period of time and requests received after termination initiate a new user session.

5. The method of claim 1, wherein the user session is defined by user log-in and log-out events.

6. The method of claim 1, wherein the global session server is distributed across a number of physical computer systems.

7. The method of claim 6, wherein the global session server includes master and shadow copies of the session data.

8. The method of claim 1, wherein the session data in the global session server is locked from access after retrieving the session data and is unlocked after updating the session data.

9. The method of claim 1, wherein at least one of the web system engines is implemented on a plurality of physical computer systems.

10. The method of claim 9, wherein each computer system has a session manager, the session manager managing access to the global session server.

11. The method of claim 10, wherein each physical computer system has a global session server stored in memory and holding master or shadow copies of session data for user sessions.

12. A web system that maintains a state for a user session, comprising:

a plurality of web system engines; and a global session server stored in memory and accessible by the web system engines;

the web system engines operable to receive a request from a user that initiates a user session with the web system and operable to process the request and provide a web page to the user;

the web system engines also operable to store a single set of session data representing a state of the user session in the global session server such that the web system engines can share the session data; and the web system engines further operable, for each subsequent request associated with the user session:

to receive the subsequent request;

to retrieve the session data from the global session server;

to process the subsequent request using the session data and provide a web page to the user;

to change the session data to reflect the processing; and to update the single set of session data in the global session server according to the changed session data.

13. The web system of claim 12, wherein the session data includes name/value pairs where the values comprise text and numbers.

14. The web system of claim 12, wherein the session data includes name/value pairs where the values comprise self describing objects such as text, numbers, arrays, and interfaces to other objects.

15. The web system of claim 12, wherein the user session terminates after a specified period of time and requests received after termination initiate a new user session.

16. The web system of claim 12, wherein the user session is defined by user log-in and log-out events.

17. The web system of claim 12, wherein the global session server is distributed across a number of physical computer systems.

18. The web system of claim 17, wherein the global session server includes master and shadow copies of the session data.

19. The web system of claim 12, wherein the session data in the global session server is locked from access after retrieving the session data and is unlocked after updating the session data.

20. The web system of claim 12, wherein at least one of the web system engines is implemented on a plurality of physical computer systems.

21. The web system of claim 20, wherein each computer system has a session manager, the session manager managing access to the global session server.

22. The web system of claim 21, wherein each physical computer system has a global session server stored in memory and holding master or shadow copies of session data for user sessions.

* * * * *